United States Patent
Park et al.

(10) Patent No.: US 12,148,891 B2
(45) Date of Patent: Nov. 19, 2024

(54) POLYMER ELECTROLYTE FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Myung Soo Park, Daejeon (KR); Seong Jin Park, Daejeon (KR); Hyeon Jin Go, Daejeon (KR); Seung Hwan Lee, Daejeon (KR); Han Sol Lee, Daejeon (KR); Myoung Lae Kim, Daejeon (KR); Hong Won Lee, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/399,460

(22) Filed: Dec. 28, 2023

(65) Prior Publication Data
US 2024/0266614 A1    Aug. 8, 2024

(30) Foreign Application Priority Data
Dec. 28, 2022    (KR) .................. 10-2022-0187867

(51) Int. Cl.
*H01M 10/42*      (2006.01)
*H01M 10/0565*    (2010.01)
*H01M 50/383*     (2021.01)

(52) U.S. Cl.
CPC ... *H01M 10/4235* (2013.01); *H01M 10/0565* (2013.01); *H01M 50/383* (2021.01); *H01M 2300/0082* (2013.01)

(58) Field of Classification Search
None
See application file for complete search history.

(56) References Cited

U.S. PATENT DOCUMENTS

| 5,972,539 | A | * | 10/1999 | Hasegawa | H01M 10/0565 429/324 |
| 2012/0141883 | A1 | | 6/2012 | Smart et al. | |
| 2017/0194664 | A1 | * | 7/2017 | Abe | H01M 10/05 |
| 2020/0168950 | A1 | | 5/2020 | Park et al. | |
| 2020/0411905 | A1 | * | 12/2020 | Yang | H01M 10/0568 |
| 2022/0238914 | A1 | | 7/2022 | He et al. | |
| 2022/0255129 | A1 | | 8/2022 | Jang | |

FOREIGN PATENT DOCUMENTS

| CN | 105514483 A | | 4/2016 | |
| CN | 115894794 A | | 4/2023 | |
| EP | 2889946 A1 | | 7/2015 | |
| JP | 2002-265539 A | | 9/2002 | |
| JP | 2011-165553 A | | 8/2011 | |
| KR | 20070021962 A | * | 2/2007 | |
| KR | 2011010516 A | * | 2/2011 | ............ H01G 11/56 |
| KR | 20170092933 A | * | 8/2017 | |
| KR | 10-2019-0062228 A | | 6/2019 | |

OTHER PUBLICATIONS

Machine translation of KR 2007-0021962, published on Feb. 23, 2007 (Year: 2007).*
Machine translation of KR 20110010516, published on Feb. 1, 2011 (Year: 2011).*
Machine translation of KR 20170092933, published on Aug. 14, 2017 (Year: 2017).*
Machine translation of CN 115894794, published on Apr. 4, 2023 (Year: 2023).*
European Search Report issued in EP Patent Application No. 23220200.2, dated May 24, 2024, 9 pages.

* cited by examiner

*Primary Examiner* — Anca Eoff
(74) *Attorney, Agent, or Firm* — Perkins Coie LLP (57) ABSTRACT

A polymer electrolyte for a lithium secondary battery that may include: a fluorine-based solvent; a lithium salt; and a flame retardant polymer containing phosphorus and fluorine, wherein the polymer electrolyte has a fluorine content of 35 to 60% by weight and a phosphorus content of 2.3 to 7.5% by weight. Lithium secondary batteries containing the polymer electrolyte exhibit improved flame retardancy and ionic conductivity as well as enhanced high-voltage stability.

18 Claims, 3 Drawing Sheets

POLYMER ELECTROLYTE FOR LITHIUM SECONDARY BATTERY AND LITHIUM SECONDARY BATTERY INCLUDING THE SAME

PRIORITY CLAIM AND CROSS-REFERENCE TO RELATED APPLICATION

This application claims priority to Korean Patent Application No. 10-2022-0187867 filed on Dec. 28, 2022 in the Korean Intellectual Property Office (KIPO), the entire disclosure of which is incorporated by reference herein.

TECHNICAL FIELD

The present disclosure relates to designs of compositions a polymer electrolyte for a lithium secondary battery and a lithium secondary battery including the same.

BACKGROUND

Some electrochemical devices such as rechargeable secondary batteries include a separator between the anode and cathode electrodes. A secondary battery is a battery which can be repeatedly charged to store electrical energy and discharged to release the stored electrical energy as an electrical power supply in a wide range of applications from portable electronic devices, electronic equipment, appliances, electrical vehicles and other devices or systems powered by electricity. For example, with rapid progress of information and communication, and display industries, the secondary battery has been widely applied to various portable telecommunication electronic devices such as a camcorder, a mobile phone, a laptop computer as a power source thereof. For another example, a battery pack including the secondary battery has also been developed and applied to an eco-friendly automobile that includes an electric motor as a power source thereof including a hybrid vehicle.

SUMMARY

The present disclosure discloses examples of material compositions with heterogeneous components in polymer electrolytes for electrochemical devices such as lithium secondary batteries and designs of lithium secondary batteries including the disclosed polymer electrolytes. In various specific implementations, the disclosed technology may be used to provide certain properties or benefits, including, e.g., a polymer electrolyte capable of providing excellent flame retardancy and ionic conductivity to a lithium secondary battery, or/and a polymer electrolyte capable of providing excellent high-voltage stability to a lithium secondary battery.

In one aspect, the disclosed technology can be implemented to provide a polymer electrolyte for a lithium secondary battery including: a fluorine-based solvent; a lithium salt; and a flame retardant polymer containing phosphorus and fluorine, wherein the polymer electrolyte has a fluorine content of 35 to 60% by weight and a phosphorus content of 2.3 to 7.5% by weight.

In some embodiments, the polymer electrolyte may have an oxygen content of 7.3 to 30% by weight.

In some embodiments, the flame retardant polymer may include an aromatic ring.

In some embodiments, the flame retardant polymer may include a moiety derived from a (meth)acrylate group.

In some embodiments, the flame retardant polymer may include a first structural unit represented by Formula 1 below:

[Formula 1]

wherein $R_1$ to $R_4$ may be each independently a hydrogen atom or a fluorine atom, at least one of $R_1$ to $R_4$ may be a fluorine atom, and a may be an integer of 1 to 10, and a third structural unit represented by Formula 3 below:

[Formula 3]

wherein $R_a$ may be a substituted or unsubstituted alkyl group having 1 to 5 carbon atoms, a substituted or unsubstituted aryl group having 6 to 20 carbon atoms, or a combination thereof, and n may be an integer of 0 to 5.

In some embodiments, the flame retardant polymer may include a structural unit represented by Formula 4 below:

[Formula 4]

wherein $R_9$ to $R_{16}$ may be each independently a hydrogen atom or a fluorine atom, at least one of $R_9$ to $R_{16}$ may be a fluorine atom, and c and d may be each independently an integer of 1 to 10.

In some embodiments, the flame retardant polymer may include a structural unit represented by Formula 5 below:

[Formula 5]

wherein $R_{17}$ and $R_{18}$ may be each independently a hydrogen atom or a methyl group, $R_{19}$ to $R_{26}$ may be each independently a hydrogen atom or a fluorine atom, at least one of $R_{19}$ to $R_{26}$ may be a fluorine atom, and e and f may be each independently an integer of 1 to 10.

In some embodiments, the flame retardant polymer may include a fourth structural unit represented by Formula 6 below:

[Formula 6]

wherein $R_{27}$ and $R_{28}$ may be each independently a hydrogen atom or a fluorine atom, and at least one of $R_{27}$ and $R_{28}$ may be a fluorine atom, and a fifth structural unit represented by Formula 7 below:

[Formula 7]

In some embodiments, the flame retardant polymer may include a structural unit represented by Formula 8 below:

[Formula 8]

wherein $R_{29}$ to $R_{40}$ may be each independently a hydrogen atom or a fluorine atom, and at least one of $R_{29}$ to $R_{40}$ may be a fluorine atom.

In some embodiments, the flame retardant polymer may include a structural unit represented by Formula 9 below:

[Formula 9]

wherein $R_{41}$ to $R_{46}$ may be each independently a hydrogen atom or a methyl group, $R_{47}$ to $R_{58}$ may be each independently a hydrogen atom or a fluorine atom, at least one of $R_{47}$ to $R_{58}$ may be a fluorine atom, and p1 to p6 may be each independently an integer of 1 to 10.

In some embodiments, the fluorine-based solvent may include a fluorine-containing cyclic carbonate and a fluorine-containing linear carbonate in a volume ratio of 1:9 to 3:7.

In some embodiments, the fluorine-containing cyclic carbonate may have a structure represented by Formula 10 below:

[Formula 10]

wherein $R_{59}$ to $R_{62}$ may be each independently a hydrogen atom, a fluorine atom, or an alkyl group having 1 to 5 carbon atoms, in which at least one hydrogen atom is substituted by a fluorine atom, and at least one of $R_{59}$ to $R_{62}$ may be a fluorine atom, or an alkyl group having 1 to 5 carbon atoms, in which at least one hydrogen atom is substituted by a fluorine atom.

In some embodiments, the fluorine-containing cyclic carbonate may include fluoroethylene carbonate (FEC), difluoroethylene carbonate (DFEC), and/or trifluoroethylene carbonate (TFEC).

In some embodiments, the fluorine-containing linear carbonate may have a structure represented by Formula 11 below:

[Formula 11]

wherein $R_{63}$ and $R_{64}$ may be each independently an alkyl group having 1 to 5 carbon atoms or an alkyl group having 1 to 5 carbon atoms, in which at least one hydrogen atom is substituted by a fluorine atom, and at least one of $R_{63}$ and $R_{64}$ may be an alkyl group, in which at least one hydrogen atom is substituted by a fluorine atom.

In some embodiments, the fluorine-containing linear carbonate may include methyl 2,2,2-trifluoroethylcarbonate (MTFEC), ethyl 2,2,2-trifluoroethyl carbonate (ETFEC), propyl 2,2,2-trifluoroethylcarbonate (PTFEC), methyl 2,2,2,2',2',2'-hexafluoro-isopropylcarbonate (MHFPC), ethyl 2,2,2,2',2',2'-hexafluoro-isopropyl carbonate (EHFPC), and/or di-2,2,2-trifluoroethyl carbonate (DTFEC).

In some embodiments, the lithium salt may include $LiPF_6$, $LiClO_4$, $LiBF_4$, LiFSI, LiTFSI, $LiSO_3CF_3$, LiBOB, LiFOB, LIDFOB, LiDFBP, LiTFOP, $LiPO_2F_2$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, and/or LiC$(CF_3SO_2)_3$.

In some embodiments, the polymer electrolyte may include 10 to 90% by weight of the fluorine-based solvent, 5 to 20% by weight of the lithium salt, and 2.5 to 80% by weight of the flame retardant polymer, each based on a total weight of the polymer electrolyte.

According to another aspect of the present disclosure, the disclosed technology can be implemented to provide a composition for a polymer electrolyte for a lithium secondary battery including: a fluorine-based solvent; a lithium salt; and a flame retardant monomer containing phosphorus and fluorine; wherein the polymer electrolyte has a fluorine content of 35 to 60% by weight and a phosphorus content of 2.3 to 7.5% by weight.

Further, according to another aspect of the present disclosure, the disclosed technology can be implemented to provide a lithium secondary battery including a case; an electrode assembly which includes a cathode and an anode housed in the case; and the polymer electrolyte for a lithium secondary battery according to any of the above-described embodiments, which is injected into the case.

According to some embodiments of the present disclosure, the polymer electrolyte for a lithium secondary battery may include a flame retardant polymer containing phosphorus and fluorine and a fluorine-based solvent, and may have a fluorine content of 35 to 60% by weight ('wt. %') and a phosphorus content of 2.3 to 7.5 wt. %. Accordingly, flame retardancy and ionic conductivity of the lithium secondary battery including the electrolyte may be improved, and high-voltage stability may be enhanced.

DETAILED DESCRIPTION

The technology disclosed in this patent document can be implemented in electrochemical devices such as batteries. In various implementations, the secondary battery may include a lithium secondary battery, a nickel-cadmium battery, and a nickel-hydrogen battery and, for some applications, may be configured to operate at a high operating voltage and exhibit a high energy density per unit weight to achieve a desirable fast charging speed and a relatively light weight.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

When the electrolyte included in the lithium secondary battery is liquid, there is a risk of liquid leakage and explosion. Therefore, in order to improve safety, an electrolyte including a fluorine-containing solvent and a fluorine-containing polymer can be used. One aspect of the disclosed technology is to provide a fluorine-containing solvent and fluorine-containing polymer with a relatively high combustion blocking capability, and to provide lithium secondary batteries to be operable at a high operating voltage, exhibit a high energy density per unit weight to have a relatively fast charging speed and a relatively light weight.

Hereinafter, unless specifically defined herein, "a combination thereof" may mean a mixture or copolymerization of components.

As used herein, the term "A and/or B" may mean an aspect that simultaneously includes A and B, or may mean an aspect that includes any one selected from A and B.

As used herein, the term "polymer" includes an oligomer, and includes a homopolymer and a copolymer. In this case, the copolymer may include any one of an alternating copolymer, block copolymer, random copolymer, branched copolymer, cross-linked copolymer, or all of them.

As used herein, the term "alkyl" is an organic radical derived from an aliphatic hydrocarbon by removing one hydrogen, and may include a straight or branched chain, or both forms thereof. The alkyl may have 1 to 10 carbon atoms, specifically 1 to 7 carbon atoms, or 1 to 5 carbon atoms, and more specifically 1 to 3 carbon atoms. An example of the alkyl includes methyl, ethyl, propyl, isopropyl, butyl, isobutyl, t-butyl, pentyl, hexyl, ethylhexyl, or the like, but it is not limited thereto.

As used herein, the term "aryl" is an organic radical derived from an aromatic ring by removing one hydrogen. In this case, the aromatic ring preferably includes a single or fused ring system including 4 to 7 ring atoms, and specifically 5 or 6 ring atoms in each ring, and may even include a form in which a plurality of aryls are connected by single bonds. An example of the aromatic ring includes phenyl, naphthyl, biphenyl, terphenyl, or the like, but it is not limited thereto.

Hereinafter, as long as there is no specific definition in the present disclosure, the term "(meth)acryl" may be used as a meaning including both "methacryl" and "acryl."

As used herein, the term "polymer electrolyte" may mean not only an all-solid-state electrolyte, but also a "gel polymer electrolyte" in which an electrolyte is included in a polymer-based electrolyte. For example, the gel polymer electrolyte may be in the form of a physical gel in which the electrolyte is swelled after preparing a polymer matrix, or in the form of a chemical gel prepared by curing a composition, in which the electrolyte and monomer are mixed, depending on the preparation method thereof.

As Used herein, the term "flame retardant" is understood to mean a combustion blocking capacity to block the chain combustion reaction.

Hereinafter, preferred embodiments of the present disclosure will be described in more detail with reference to the accompanying drawings. However, since the drawings attached to the present specification are only given for illustrating exemplary embodiments of present disclosure, it should not be construed as limited to such a description illustrated in the drawings.

According to one embodiment, the disclosed technology may be used to provide a polymer electrolyte for a lithium secondary battery. The polymer electrolyte includes a fluorine-based solvent, a lithium salt, and a flame retardant polymer containing phosphorus and fluorine, wherein the polymer electrolyte has a fluorine content of 35 to 60 wt. % and a phosphorus content of 2.3 to 7.5 wt. %. In addition, according to another embodiment, the disclosed technology may be used to provide a lithium secondary battery including the polymer electrolyte for a lithium secondary battery.

Accordingly, flame retardancy and ionic conductivity of the lithium secondary battery may be improved, and high-voltage stability may be enhanced.

<Polymer Electrolyte for Lithium Secondary Battery>

A polymer electrolyte for a lithium secondary battery (hereinafter, may be abbreviated as a polymer electrolyte) according to some embodiments of the disclosed technology includes a fluorine-based solvent, a lithium salt, and a flame retardant polymer containing phosphorus and fluorine, wherein the polymer electrolyte may have a fluorine content of 35 to 60 wt. % and a phosphorus content of 2.3 to 7.5 wt. %.

By including the fluorine-based solvent, it is possible to provide a polymer electrolyte which has a high flash point, high chemical resistance, thermal properties and electrochemical stability, and is capable of forming a stable electrode-electrolyte interface (LiF or F-rich layer). For example, the fluorine-based solvent may include a fluorine-containing cyclic carbonate and a fluorine-containing linear carbonate.

In some embodiments, the fluorine-containing cyclic carbonate may be represented by Formula 10 below.

[Formula 10]

In Formula 10, $R_{59}$ to $R_{62}$ may be each independently a hydrogen atom, a fluorine atom, or an alkyl group having 1 to 5 carbon atoms, in which at least one hydrogen atom is substituted by a fluorine atom, and at least one of $R_{59}$ to $R_{62}$ may be a fluorine atom, or an alkyl group having 1 to 5 carbon atoms, in which at least one hydrogen atom is substituted by a fluorine atom.

For example, $R_{59}$ to $R_{62}$ may be each independently a hydrogen atom or a fluorine atom, and at least one of $R_{59}$ to $R_{62}$ may be a fluorine atom.

For example, any one of $R_{59}$ to $R_{62}$ may be a fluorine atom, any two of $R_{59}$ to $R_{62}$ may be a fluorine atom, any three of $R_{59}$ to $R_{62}$ may be a fluorine atom, or all of $R_{59}$ to $R_{62}$ may be a fluorine atom.

In some embodiments, the fluorine-containing cyclic carbonate may include fluoroethylene carbonate (FEC), difluoroethylene carbonate (DFEC), and/or trifluoroethylene carbonate (TFEC).

In one embodiment, the fluorine-containing cyclic carbonate may include fluoroethylene carbonate (FEC).

In some embodiments, the fluorine-containing linear carbonate may have a structure represented by Formula 11 below.

[Formula 11]

In Formula 11, $R_{63}$ and $R_{64}$ may be each independently an alkyl group having 1 to 5 carbon atoms or an alkyl group having 1 to 5 carbon atoms, in which at least one hydrogen atom is substituted by a fluorine atom, and at least one of $R_{63}$ and $R_{64}$ may be an alkyl group, in which at least one hydrogen atom is substituted by a fluorine atom.

For example, $R_{63}$ and $R_{64}$ may be each independently an alkyl group having 1 to 5 carbon atoms, an alkyl group having 1 to 4 carbon atoms, an alkyl group having 1 to 3 carbon atoms, a methyl group or an ethyl group, or a methyl group.

For example, $R_{63}$ and $R_{64}$ may be each independently an alkyl group having 1 to 5 carbon atoms, in which at least one hydrogen atom is substituted by a fluorine atom, an alkyl group having 1 to 4 carbon atoms, in which at least one hydrogen atom is substituted by a fluorine atom, an alkyl group having 1 to 3 carbon atoms, in which at least one hydrogen atom is substituted by a fluorine atom, a methyl group or an ethyl group, in which at least one hydrogen atom is substituted by a fluorine atom, or a methyl group, in which at least one hydrogen atom is substituted by a fluorine atom. Herein, the number of hydrogen atoms substituted by the fluorine atoms may be one or two or more. In some embodiments, the alkyl group may be a perfluoroalkyl group in which all hydrogen atoms are substituted by fluorine atoms.

In some embodiments, the fluorine-containing linear carbonate may include methyl 2,2,2-trifluoroethylcarbonate (MTFEC), ethyl 2,2,2-trifluoroethyl carbonate (ETFEC), propyl 2,2,2-trifluoroethylcarbonate (PTFEC), methyl 2,2,2',2',2'-hexafluoro-isopropylcarbonate (MHFPC), ethyl 2,2,2,2',2',2'-hexafluoro-isopropyl carbonate (EHFPC), and/or di-2,2,2-trifluoroethyl carbonate (DTFEC).

In one embodiment, the fluorine-containing linear carbonate may include methyl 2,2,2-trifluoroethyl carbonate (MTFEC).

In some embodiments, the fluorine-based solvent may include the fluorine-containing cyclic carbonate and the fluorine-containing linear carbonate in a volume ratio of 1:9 to 3:7. For example, the volume ratio of the fluorine-containing cyclic carbonate to the fluorine-containing linear carbonate may be in a range of 1:9 to 3:7, 1.5:8.5 to 2.5:7.5, 2:8 to 3:7, or 2:8 to 2.5:7.5. Within the above range, the polymer electrolyte may have a fluorine content of 35 to 60 wt. %, a phosphorus content of 2.3 to 7.5 wt. %, and an oxygen content of 7.3 to 30.0 wt. %, each based on a total weight of the polymer electrolyte.

Accordingly, flame retardancy and high-voltage stability of a lithium secondary battery including the polymer electrolyte may be further improved.

In one embodiment, the fluorine-based solvent may include fluoroethylene carbonate (FEC) and methyl 2,2,2-trifluoroethyl carbonate (MTFEC) in a volume ratio of 2:8 to 3:7.

In some embodiments, the lithium salt may include $LiPF_6$, $LiClO_4$, $LiBF_4$, LiFSI, LiTFSI, $LiSO_3CF_3$, LiBOB, LiFOB, LIDFOB, LiDFBP, LiTFOP, $LiPO_2F_2$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, and/or $LiC(CF_3SO_2)_3$.

In one embodiment, the lithium salt may include $LiPF_6$.

A concentration of the lithium salt dissolved in the fluorine-based solvent may be 0.5 to 3 M. For example, the concentration of the lithium salt may be 0.5 to 3 M, 0.8 to 1.5 M, or 0.8 to 1.2 M. Within the above ranges, lithium ions and/or electrons may move more smoothly than those outside of the ranges.

In some embodiments, the flame retardant polymer may include an aromatic ring.

In some embodiments, the flame retardant polymer may include a moiety derived from a (meth)acrylate group.

In some embodiments, the flame retardant polymer may include a fluorinated phosphonate, a fluorinated phosphazene, or a combination thereof.

In some embodiments, when the flame retardant polymer includes the fluorinated phosphonate, the flame retardant polymer may include a first structural unit represented by Formula 1 below and a third structural unit represented by Formula 3 below. In some embodiments, the flame retardant polymer may further include a second structural unit represented by Formula 2 below.

[Formula 1]

In Formula 1, $R_1$ to $R_4$ may be each independently a hydrogen atom or a fluorine atom, at least one of $R_1$ to $R_4$ may be a fluorine atom, and a may be an integer of 1 to 10.

For example, at least two of $R_1$ to $R_4$ may be a fluorine atom, and specifically $R_1$ to $R_4$ may be a fluorine atom.

For example, a may be an integer of 1 to 8, an integer of 1 to 5, an integer of 1 to 3, or an integer of 2.

[Formula 2]

In Formula 2, $R_5$ to $R_8$ may be each independently a hydrogen atom or a fluorine atom, at least one of $R_5$ to $R_8$ may be a fluorine atom, and b may be an integer of 1 to 10.

For example, at least two of $R_5$ to $R_8$ may be a fluorine atom, and specifically $R_5$ to $R_8$ may be a fluorine atom.

For example, b may be an integer of 1 to 8, an integer of 1 to 5, an integer of 1 to 3, or an integer of 2.

[Formula 3]

In Formula 3, $R_a$ is a substituted or unsubstituted alkyl group having 1 to 5 carbon atoms, a substituted or unsubstituted aryl group having 6 to 20 carbon atoms, or a combination thereof, and n is an integer of 0 to 5.

The n may be an integer of 0 to 3, specifically, n may be 0 or 1, and more specifically, n may be 0.

In some embodiments, the flame retardant polymer may include a structural unit represented by Formula 4 below.

[Formula 4]

In Formula 4, $R_9$ to $R_{16}$ may be each independently a hydrogen atom or a fluorine atom, at least one of $R_9$ to $R_{16}$ may be a fluorine atom, and c and d may be each independently an integer of 1 to 10.

For example, $R_9$ to $R_{16}$ may be a fluorine atom.

For example, c and d may be each independently an integer of 1 to 8, an integer of 1 to 5, an integer of 1 to 3, or an integer of 2.

In some embodiments, when the flame retardant polymer includes the fluorinated phosphonate, the flame retardant polymer may include a structural unit represented by Formula 5 below.

[Formula 5]

In Formula 5, $R_{17}$ and $R_{18}$ may be each independently a hydrogen atom or a methyl group, $R_{19}$ to $R_{26}$ may be each independently a hydrogen atom or a fluorine atom, at least one of $R_{19}$ to $R_{26}$ may be a fluorine atom, and e and f may be each independently an integer of 1 to 10.

For example, $R_{17}$ and $R_{18}$ may be the same as or different from each other, and specifically may be a hydrogen atom.

For example, at least two of $R_{19}$ to $R_{26}$ may be a fluorine atom, and at least four of $R_{19}$ to $R_{26}$ may be a fluorine atom, and specifically $R_{19}$ to $R_{26}$ may be a fluorine atom.

For example, e and f may be the same as or different from each other, and may be each independently an integer of 1 to 8, an integer of 1 to 5, an integer of 1 to 3, or an integer of 2.

In some embodiments, when the flame retardant polymer includes the fluorinated phosphozene, the flame retardant polymer may include a fourth structural unit represented by Formula 6 below and a fifth structural unit represented by Formula 7 below.

[Formula 6]

In Formula 6, $R_{27}$ and $R_{28}$ may be each independently a hydrogen atom or a fluorine atom, and at least one of $R_{27}$ and $R_{28}$ may be a fluorine atom.

For example, $R_{27}$ and $R_{28}$ may be a fluorine atom.

[Formula 7]

In some embodiments, when the flame retardant polymer includes the fluorinated phosphozene, the flame retardant polymer may include a structural unit represented by Formula 8 below.

[Formula 8]

In Formula 8, $R_{29}$ to Rao may be each independently a hydrogen atom or a fluorine atom, and at least one of $R_{29}$ to $R_{40}$ may be a fluorine atom.

For example, at least two of $R_{29}$ to $R_{40}$ may be a fluorine atom, at least six of $R_2$ to $R_{40}$ may be a fluorine atom, or $R_{29}$ to $R_{40}$ may be a fluorine atom.

In some embodiments, the flame retardant polymer may include a structural unit represented by Formula 9 below.

[Formula 9]

In Formula 9, $R_{41}$ to $R_{46}$ may be each independently a hydrogen atom or a methyl group, $R_{47}$ to $R_{58}$ may be each independently a hydrogen atom or a fluorine atom, at least one of $R_{47}$ to $R_{58}$ may be a fluorine atom, and p1 to p6 may be each independently an integer of 1 to 10.

For example, $R_{41}$ to $R_{46}$ may be the same as or different from each other, and specifically all of them may be a hydrogen atom.

For example, at least two of $R_{47}$ to $R_{58}$ may be a fluorine atom, at least six of $R_{47}$ to $R_{58}$ may be a fluorine atom, or $R_{47}$ to $R_{58}$ may be a fluorine atom.

For example, p1 to p6 may be the same as or different from each other, and may be each independently an integer of 1 to 8, an integer of 1 to 5, an integer of 1 to 3, or an integer of 2.

By including the above-described flame retardant polymer, flame retardancy and high-voltage stability of a lithium secondary battery including the polymer electrolyte may be further improved.

When the lithium secondary battery is burned, highly active H radicals and OH radicals are formed, and the radicals may cause a chain combustion reaction. Although not intending to be bound to any specific theory, the flame retardant polymer according to the present disclosure may have a combustion blocking capacity to block the chain combustion reaction by releasing P radicals to capture the highly active H radicals and OH radicals.

In addition, although not intending to be bound to any specific theory, the flame retardant polymer according to the present disclosure may capture OH radicals by generating F radicals upon decomposition at a high temperature, may have a high flash point, high chemical resistance, thermal properties and electrochemical stability, and may form a stable electrode-electrolyte interface (LiF or F-rich layer).

In addition, although not intending to be bound to any specific theory, the flame retardant polymer including the above-described structural units may include both phosphorus and fluorine as described above, thereby having a combustion blocking capacity while inhibiting an increase in resistance due to a side reaction of phosphorus with the electrode and electrolyte. Thus, a more stable electrode-electrolyte interface may be formed while further improving safety of the polymer electrolyte. In addition, the monomers are polymerized to form a polymer network, such that decomposition of the polymer electrolyte may be further inhibited.

Accordingly, the polymer electrolyte including the above-described flame retardant polymer containing phosphorus and fluorine may be used to manufacture a lithium secondary battery having improved flame retardancy and ionic conductivity.

In addition, when the lithium secondary battery is driven at a high voltage, the electrolyte is oxidatively decomposed on the surface of an electrode to cause a side reaction with the electrode and the electrolyte, and thus lithium ions may be reduced and the electrolyte may be depleted. As described above, the flame retardant polymer may form a stable electrode-electrolyte interface and inhibit decomposition of the polymer electrolyte. Accordingly, the polymer electrolyte including the flame retardant polymer may be used to provide a lithium secondary battery having improved high-voltage stability.

In some embodiments, the polymer electrolyte may have a fluorine content of 35 to 60 wt. % and a phosphorus content of 2.3 to 7.5 wt. %.

In some embodiments, the polymer electrolyte may have a fluorine content of 35 to 60 wt. %. For example, the fluorine content may be 35 to 60 wt. %, 36 to 50 wt. %, or 36.5 to 40 wt. %. Within the above range, the polymer electrolyte may sufficiently dissociate the lithium salt, such that the ionic conductivity of the lithium secondary battery may be improved. In addition, the polymer electrolyte may form a stable electrode-electrolyte interface and inhibit decomposition of the polymer electrolyte, such that the high-voltage stability of the lithium secondary battery may be further improved.

In some embodiments, the polymer electrolyte may have a phosphorus content of 2.3 to 7.5 wt. %. For example, the phosphorus content may be 2.3 to 7.5 wt. %, 2.3 to 5.5 wt. %, or 2.4 to 4.0 wt. %. Within the above range, the polymer electrolyte may have high combustion blocking capacity, thereby improving the flame retardancy of the lithium secondary battery.

Specifically, if the content of the fluorine and phosphorus is less than the above-described range, the flame retardancy of the lithium secondary battery may be deteriorated due to the reduced combustion blocking capacity of the polymer electrolyte. In addition, the capacity to form a stable electrode-electrolyte interface and the capacity to inhibit decomposition of the polymer electrolyte are reduced, such that the high-voltage stability of the lithium secondary battery may be deteriorated. Further, if the fluorine and phosphorus content exceeds the above-described range, the lithium salt may not be dissolved and dissociated, and the ionic conductivity may be deteriorated.

In some embodiments, the polymer electrolyte may have an oxygen content of 7.3 to 30 wt. %. For example, the oxygen content may be 7.3 to 30 wt. %, 15 to 30 wt. %, or 25 to 30 wt. %. Within the above range, the flame retardancy and ionic conductivity of the lithium secondary battery may be further improved, and high-voltage stability may be further enhanced.

In some embodiments, the polymer electrolyte may include 10 to 90 wt. % of the fluorine-based solvent, 5 to 20 wt. % of the lithium salt, and 2.5 to 80 wt. % of the flame retardant polymer, each based on the total weight of the polymer electrolyte.

For example, the fluorine-based solvent may be included in an amount of 10 to 90 wt. %, 30 to 90 wt. %, 50 to 88 wt. %, 70 to 88 wt. %, or 80 to 85 wt. %. The lithium salt may be included in an amount of 5 to 20 wt. %, 7 to 15 wt. %, or 10 to 12 wt. %. The flame retardant polymer may be included in an amount of 2.5 to 80 wt. %, 3 to 70 wt. %, 3 to 50 wt. %, 4 to 30 wt. % or 5 to 10 wt. %.

Within the above range, the flame retardancy and ionic conductivity of the lithium secondary battery may be further improved, and high-voltage stability may be further enhanced.

In some embodiments, the polymer electrolyte may have an ionic conductivity of $5 \times 10^{-4}$ S/cm or more.

In general, polymer electrolytes may have lower ionic conductivity than liquid electrolytes. However, the above-described polymer electrolyte includes the flame retardant polymer containing phosphorus and fluorine, such that a reduction in lithium ions due to a side reaction with the electrode and the electrolyte may be blocked. Therefore, lithium ion diffusion characteristics may be improved due to higher ionic conductivity than in the case of using the conventional polymer electrolyte.

In some embodiments, the content of each element forming the polymer electrolyte, for example, fluorine, phosphorus, and oxygen, may be measured using an elemental analyzer (EA), inductively coupled plasma-optical emission spectroscopy (ICP-OES), ion chromatography (IC), and nuclear magnetic resonance (NMR).

In some embodiments, the polymer electrolyte may be a non-aqueous electrolyte which does not include water.

A composition for a polymer electrolyte for a lithium secondary battery according to some embodiments of the disclosed technology may include a fluorine-based solvent, a lithium salt, and a flame retardant monomer containing phosphorus and fluorine, and the polymer electrolyte may have a fluorine content of 35 to 60 wt. % and a phosphorus content of 2.3 to 7.5 wt. %.

The description of the fluorine-based solvent and the lithium salt is the same as that of the fluorine-based solvent and the lithium salt in the description of the polymer electrolyte for a lithium secondary battery.

In some embodiments, the flame retardant monomer may include fluorinated phosphonate having a structure represented by Formula 12 below or fluorinated phosphazene having a structure represented by Formula 13 below.

[Formula 12]

In Formula 12, $R_{65}$ to $R_{72}$ may be each independently a hydrogen atom or a fluorine atom, at least one of $R_{65}$ to $R_{72}$ may be a fluorine atom, g and h may be each independently an integer of 1 to 10, $R_{73}$ to $R_{76}$ may be each independently a hydrogen atom or a polymerizable group, wherein at least one of $R_{73}$ to $R_{76}$ is a polymerizable group. In some embodiments, at least two of $R_{73}$ to $R_{76}$ may be a polymerizable group. In some embodiments, the polymerizable group may be an acryloyl group or a methacryloyl group.

For example, at least two of $R_{65}$ to $R_{72}$ may be a fluorine atom, at least four of $R_{65}$ to $R_{72}$ may be a fluorine atom, and specifically $R_{65}$ to $R_{72}$ may be a fluorine atom.

For example, g and h may be the same as or different from each other, and may be each independently an integer of 1 to 8, an integer of 1 to 5, an integer of 1 to 3, or an integer of 2.

For example, any two of $R_{73}$ to $R_{76}$ may be a polymerizable group, any three of $R_{73}$ to $R_{76}$ may be a polymerizable group, or all of $R_{73}$ to $R_{76}$ may be a polymerizable group. The polymerizable group may be a (meth)acryloyl group.

[Formula 13]

In Formula 13, $R_{77}$ to $R_{88}$ may be each independently a hydrogen atom or a fluorine atom, at least one of $R_{77}$ to $R_{88}$ may be a fluorine atom, $R_{89}$ to $R_{94}$ may be each independently a hydrogen atom or a polymerizable group, wherein at least one of $R_{89}$ to $R_{94}$ is a polymerizable group, and q1 to q6 may be each independently an integer of 1 to 10. In some embodiments, at least two of $R_{89}$ to $R_{94}$ may be a polymerizable group. In some embodiments, the polymerizable group may be an acryloyl group or a methacryloyl group.

For example, at least two of $R_{77}$ to $R_{88}$ may be a fluorine atom, at least six of $R_{77}$ to $R_{88}$ may be a fluorine atom, or $R_{77}$ to $R_{88}$ may be a fluorine atom.

For example, any two of $R_{89}$ to $R_{94}$ may be a polymerizable group, any three of $R_{89}$ to $R_{94}$ may be a polymerizable group, any four of $R_{89}$ to $R_{94}$ may be a polymerizable group, any five of $R_{89}$ to $R_{94}$ may be a polymerizable group, or all of $R_{89}$ to $R_{94}$ may be a polymerizable group. The polymerizable group may be a (meth)acryloyl group.

For example, q1 to q6 may be the same as or different from each other, and may be each independently an integer of 1 to 8, an integer of 1 to 5, an integer of 1 to 3, or an integer of 2.

In some embodiments, the flame retardant monomer may be thermally polymerized at 50 to 90° C. for 40 to 70 minutes to obtain a flame retardant polymer. For example, the flame retardant polymer may be the above-described fluorinated phosphonate, fluorinated phosphazene, or a combination thereof.

<Lithium Secondary Battery>

Figure 1:
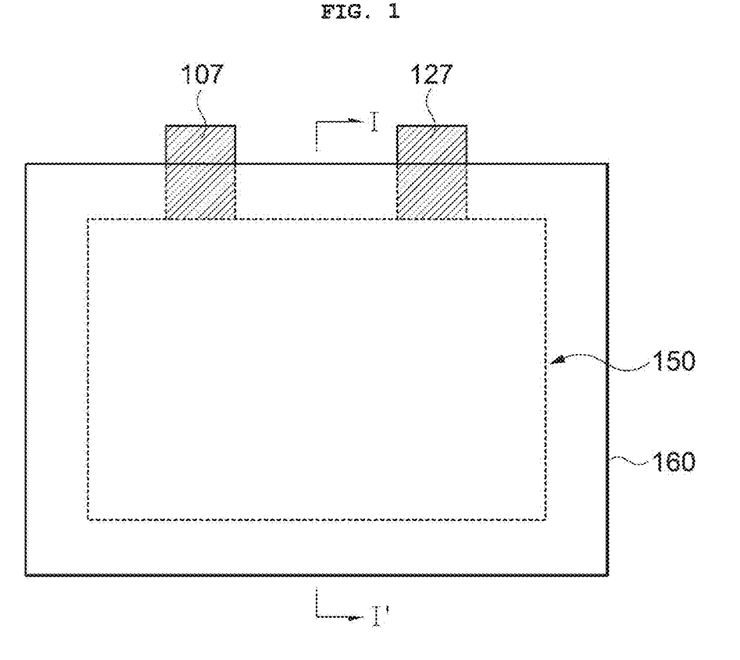
FIG. 1 is a plan view schematically illustrating a lithium secondary battery according to some embodiments of the disclosed technology.
Figure 2:
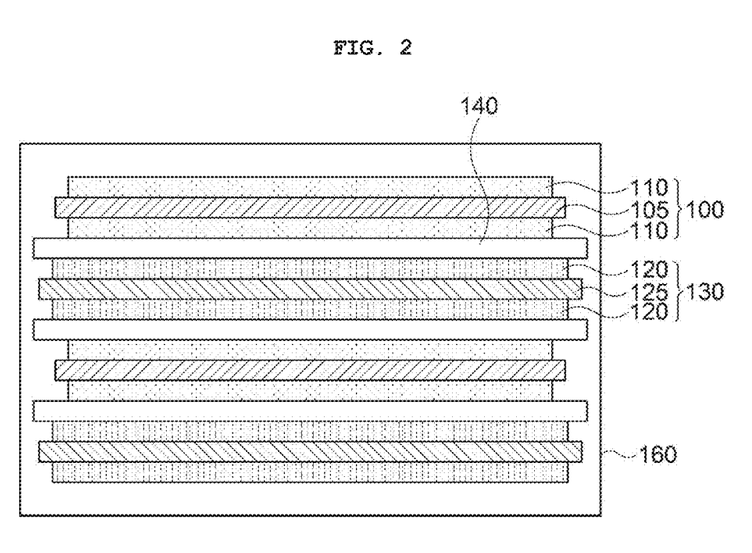
FIG. 2 is a cross-sectional view schematically illustrating a lithium secondary battery according to some embodiments of the disclosed technology.

FIGS. 1 and 2 are plan and cross-sectional views, respectively, that schematically illustrate a lithium secondary battery according to some embodiments of the disclosed technology.

Referring to FIGS. 1 and 2, the lithium secondary battery may include an electrode assembly 150 including a cathode 100 and an anode 130. The electrode assembly 150 may be housed in a case 160 together with the above-described polymer electrolyte according to the disclosed technology. For example, the electrode assembly 150 may further include a solid electrolyte 140 interposed between the cathode 100 and the anode 130. In addition, optionally, the electrode assembly 150 may further include or exclude a separation membrane between the cathode 100 and the anode 130.

The cathode 100 may include a cathode active material layer 110 formed by applying a cathode active material to a cathode current collector 105. The cathode active material may include a compound capable of reversibly intercalating and deintercalating lithium ions.

In some embodiments, the cathode active material may be a secondary particle formed by assembling or aggregating a plurality of primary particles into substantially a single particle, or may be in the form of a single particle. The single particle form may mean, for example, excluding a secondary particle formed by assembling or aggregating a plurality of (e.g., greater than 10) primary particles into substantially a single particle. However, the single particle form does not exclude a single body form formed by attaching or closely contacting single particles in a range of 2 to 10 (e.g., a structure converted into a single particle). In some embodiments, the cathode active material may include both the secondary particle form and the single particle form.

In some embodiments, the cathode active material may include a lithium-transition metal oxide. For example, the cathode active material may include a lithium-transition metal oxide such as lithium cobalt oxide ($LiCoO_2$), lithium manganese oxide ($LiMn_2O_4$), lithium nickel oxide ($LiNiO_2$), and lithium iron phosphate (LFP)-based cathode active materials, etc., or a lithium-transition metal composite oxide in which some of these transition metals are substituted by another transition metal.

For example, the lithium-transition metal oxide may include nickel (Ni), and may further include cobalt (Co), and/or manganese (Mn). For example, the cathode active material may include an NCM-based (i.e., Ni, Co and Mn-based) cathode active material; Mn-rich-based cathode active material; or Li-rich layered oxide (LLO), over-lithiated oxide (OLO) or over-lithiated layered oxide (OLLO)-based cathode active material. For example, the lithium-transition metal oxide may have structures represented by Formulae 14-1 to 14-3 below.

$$Li_aNi_bM_{1-b}O_2 \quad \text{[Formula 14-1]}$$

In Formula 14-1, a and b are in a range of $0.9 \leq a \leq 1.2$, and $b \geq 0.5$, respectively, and M is at least one of Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba and Zr. Specifically, in Formula 14-1, a may be in a range of $0.95 \leq a \leq 1.08$, and b may be 0.6 or more, 0.8 or more, greater than 0.8, 0.9 or more, or 0.98 or more. Specifically, in Formula 14-1, M may include Co, Mn or Al, and more specifically, M may include Co and Mn, and optionally further include Al.

$$pLi_2MnO_3 \cdot (1-p)LiqJO_2 \quad \text{[Formula 14-2]}$$

In Formula 14-2, p and q may be in a range of $0<p<1$, and $0.9 \leq q \leq 1.2$, respectively, and J may be Mn, Ni, Co, Fe, Cr, V, Cu, Zn, Ti, Al, Mg, and/or B.

$$Li_{1+x}M_{1-x}O_2 \quad \text{[Formula 14-3]}$$

In Formula 14-3, x is in a range of $0 \leq x \leq 0.4$, and M is at least one of Na, Mg, Ca, Y, Ti, Zr, Hf, V, Nb, Ta, Cr, Mo, W, Ni, Mn, Co, Fe, Cu, Ag, Zn, B, Al, Ga, C, Si, Sn, Ba and Zr. Specifically, in Formula 14-3, M may include Ni, Co, Mn, or Al, more specifically include Ni, Co and Mn, and optionally further include Al.

In addition, the cathode active material may be a lithium iron phosphate (LFP)-based cathode active material represented by a formula of $LiFePO_4$.

A slurry may be prepared by mixing and stirring the cathode active material with a binder, a conductive material, and/or a dispersant in a solvent. The slurry may be applied to the cathode current collector 105, followed by compressing and drying, thereby preparing the cathode 100.

The cathode current collector 105 may include, for example, stainless steel, nickel, aluminum, titanium, copper, or an alloy thereof, or may include aluminum or an aluminum alloy.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR). The binder may be used together with a thickener such as carboxymethyl cellulose (CMC). For example, a PPC-LiTFSI-based binder may be used as a cathode binder.

The conductive material may be included to facilitate the movement of electrons between active material particles. For example, the conductive material may include a carbon-based conductive material such as graphite, carbon black, graphene, or carbon nanotubes and/or a metal-based conductive material including tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

In some embodiments, as the anode active material, a carbon-based compound such as artificial graphite, natural graphite, or amorphous carbon or a silicon (Si)-based compound may be used. For example, as the anode active material, silicon-carbon particles including pure Si, silicon oxide (SiOx; 0<x<2), silicon carbide (SiC), or a carbon core and a silicon coating layer may be used.

In some embodiments, the anode 130 may include metallic lithium. For example, as the anode active material, metallic lithium or a lithium-metal alloy may be used, and the anode active material layer 120 may include a lithium metal foil disposed on the anode current collector 125.

The anode current collector 125 may include, for example, gold, stainless steel, nickel, aluminum, titanium, copper, or an alloy thereof, or may include copper or a copper alloy.

In some embodiments, a slurry may be prepared by mixing and stirring the anode active material with a binder, a conductive material and/or a dispersant in a solvent. The slurry may be applied to the anode current collector 125, followed by compressing and drying, thereby preparing the anode 130. As the conductive material, materials that are substantially the same as or similar to the above-described materials may be used.

In some embodiments, a binder for an anode may include: an organic binder such as vinylidene fluoride-hexafluoropropylene copolymer (PVDF-HFP), polyvinylidene fluoride (PVDF), polyacrylonitrile, polymethyl methacrylate, PPC-LiTFSI, etc.; or an aqueous binder such as SBR, etc., and may be used together with a thickener such as CMC.

Meanwhile, the lithium secondary battery may be an anodeless secondary battery. That is, the lithium secondary battery may be a battery in which the anode active material layer 120 is not formed on the anode current collector 125 during a process of assembling the battery. When the anodeless lithium secondary battery is initially charged or first charged, a main cathode active material and a sacrificial cathode active material may be delithiated, and lithium ions generated from the cathode active material may be reduced on the anode current collector 125 to form a lithium layer of a lithium metal layer or a solid lithium layer.

The solid electrolyte 140 may be interposed between the cathode 100 and the anode 130. Optionally, a separation membrane may be interposed between the cathode 100 and the anode 130, and the separation membrane may include a porous polymer film made of a polyolefin-based polymer such as ethylene homopolymer, propylene homopolymer, ethylene/butene copolymer, ethylene/hexene copolymer, ethylene/methacrylate copolymer, or the like. The separation membrane may include a nonwoven fabric made of glass fiber having a high melting point, polyethylene terephthalate fiber, or the like.

In some embodiments, the anode 130 may have a greater area and/or volume than cathode 100. Accordingly, lithium ions generated from the cathode 100 may smoothly move to the anode 130 without precipitation in the middle, for example.

According to some embodiments of the disclosed technology, an electrode cell may be defined by the cathode 100, the anode 130, and the solid electrolyte 140, and a plurality of electrode cells may be laminated to form, for example, a jelly roll type electrode assembly 150. For example, the electrode assembly 150 may be formed by winding, lamination, folding, or the like of the solid electrolyte 140.

Optionally, an electrode cell may be defined by the cathode 100, the anode 130 and the separation membrane, and a jelly roll type electrode assembly 150 may be formed by winding, lamination, folding, or the like of the separation membrane.

The electrode assembly 150 may be housed in the case 160 together with the electrolyte to define a lithium secondary battery.

As shown in FIG. 1, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

The lithium secondary battery may be manufactured, for example, in a cylindrical shape using a can, a square shape, a pouch type or a coin shape.

Hereinafter, exemplary examples are proposed to facilitate understanding of the present disclosure. However, the following examples are only given for illustrating the present disclosure and those skilled in the art will obviously understand that various alterations and modifications are possible within the scope and spirit of the present disclosure. Such alterations and modifications are duly included in the appended claims.

Synthesis Example

1. Preparation of Flame Retardant Monomer 10 g (34.00 mmol) of perfluoro-3,6-dioxaoctane-1,8-diol and 4.13 g (40.80 mmol) of triethylamine (TEA) were sequentially quantified in 100 mL of tetrahydrofuran (THF), and were introduced into a reactor. After cooling the reactor to 0° C., 2.8 g (30.95 mmol) of acrylyl chloride dissolved in 15 mL of THF was added slowly for 1 hour, and the mixture was stirred under room temperature condition for 18 hours.

The stirred solution was filtered to remove TEA-HCl salts, and was subjected to removal of reactive substances once with 0.1 N HCl aqueous solution and NaHCO$_3$ aqueous solution, respectively, then washed with H$_2$O. Thereafter, the solvent was removed by vacuum drying, followed by performing column purification with hexane/ethyl acetate to obtain 3.5 g of an intermediate.

The obtained intermediate was dissolved in 100 mL of dichloromethane, then 2.55 g (25.2 mmol) of TEA and 0.98 g (5.03 mmol) of dichlorophenylphosphine oxide were sequentially added thereto. After stirring at room temperature for 24 hours, the stirred solution was again subjected to removal of reactive substances once with 0.1N HCl aqueous solution and NaHCO$_3$ aqueous solution, respectively, then washed with H$_2$O. Thereafter, the mixture was subjected to column purification with hexane/ethyl acetate to obtain 2.67 g of a flame retardant monomer (fluorinated phosphonate) having a structure represented by Formula 15 below.

[Formula 15]

EXAMPLES AND COMPARATIVE EXAMPLES

1. Example 1

FEC and MTFEC, which are fluorine-based solvents, were mixed in a volume ratio of 1:4, respectively, and stirred for 12 hours to prepare a mixed solvent. An electrolyte was prepared by dissolving 1M LiPF$_6$ in the mixed solvent and stirring for 12 hours. The prepared electrolyte and the flame retardant monomer obtained in the synthesis example were mixed and stirred for 30 minutes, and then heated at 70° C. for 1 hour to prepare a polymer electrolyte.

The contents of the fluorine-based solvent, lithium salt, and flame retardant polymer based on the total weight of the polymer electrolyte are shown in Table 1 below, and the contents of the fluorine, phosphorus, and oxygen elements included in the polymer electrolyte are shown in Table 2 below.

2. Comparative Example 1

A polymer electrolyte was prepared according to the same procedures as described in Example 1, except that a polyethylene glycol diacrylate (PEGDA) monomer having a structure represented by Formula 16 was used instead of the flame retardant monomer obtained in the synthesis example.

The contents of the fluorine-based solvent, lithium salt, and polymer based on the total weight of the polymer electrolyte are shown in Table 1 below, and the contents of the fluorine, phosphorus, and oxygen elements included in the polymer electrolyte are shown in Table 2 below.

[Formula 16]

3. Comparative Example 2

A liquid electrolyte containing a fluorine-based solvent and a lithium salt was prepared according to the same procedures as described in Example 1, except that the flame retardant monomer obtained in the synthesis example was not used.

The contents of the fluorine-based solvent and the lithium salt based on the total weight of the electrolyte are shown in Table 1 below, and the contents of the fluorine, phosphorus, and oxygen elements included in the electrolyte are shown in Table 2 below.

4. Comparative Example 3

Organic solvents ethylene carbonate (EC) and ethylmethyl carbonate (EMC) were mixed in a volume ratio of 3:7, respectively, and stirred for 12 hours to prepare a mixed solvent. A liquid electrolyte was prepared by dissolving 1M LiPF$_6$ in the mixed solvent and stirring for 12 hours.

The contents of the organic solvent and the lithium salt based on the total weight of the electrolyte are shown in Table 1 below, and the contents of the fluorine, phosphorus, and oxygen elements included in the electrolyte are shown in Table 2 below.

5. Comparative Example 4

A polymer electrolyte was prepared according to the same procedures as described in Example 1, except that only 1,1,2,2-tetrafluoroethyl 2,2,3,3-tetrafluoropropyl ether (TTE) was used instead of the FEC and MTFEC as a fluorine-based solvent.

The contents of the fluorine-based solvent, lithium salt, and flame retardant polymer based on the total weight of the polymer electrolyte are shown in Table 1 below, and the contents of the fluorine, phosphorus, and oxygen elements included in the polymer electrolyte are shown in Table 2 below.

6. Comparative Example 5

Without using the fluorine-based solvents FEC and MTFEC, $LiPF_6$ and the flame retardant monomer obtained in the synthesis example were mixed and stirred for 30 minutes, and then heated at 70° C. for 1 hour to prepare a polymer electrolyte.

The contents of the lithium salt and the flame retardant polymer based on the total weight of the polymer electrolyte are shown in Table 1 below, and the contents of the fluorine, phosphorus, and oxygen elements included in the polymer electrolyte are shown in Table 2 below.

TABLE 1

| | Lithium salt | Solvent | Polymer |
|---|---|---|---|
| Example 1 | $LiPF_6$ (10.36 wt. %) | FEC (17.85 wt. %) and MTFEC (64.29 wt. %) | Fluorinated polyphosphonate (7.5 wt. %) |
| Comparative Example 1 | $LiPF_6$ (10.36 wt. %) | FEC (17.85 wt. %) and MTFEC (64.29 wt. %) | Polymer of PEGDA (7.5 wt. %) |
| Comparative Example 2 | $LiPF_6$ (11.2 wt. %) | FEC (19.3 wt. %) and MTFEC (69.5 wt. %) | — |
| Comparative Example 3 | $LiPF_6$ (12.3 wt. %) | EC (31.5 wt. %) and EMC (56.2 wt. %) | — |
| Comparative Example 4 | $LiPF_6$ (10.36 wt. %) | TTE (82.14 wt. %) | Fluorinated polyphosphonate (7.5 wt. %) |
| Comparative Example 5 | $LiPF_6$ (25 wt. %) | — | Fluorinated polyphosphonate (75 wt. %) |

TABLE 2

| | Fluorine content (wt. %) | Phosphorus content (wt. %) | Oxygen content (wt. %) |
|---|---|---|---|
| Example 1 | 36.94 | 2.40 | 29.21 |
| Comparative Example 1 | 34.15 | 2.11 | 30.35 |
| Comparative Example 2 | 36.92 | 2.28 | 29.84 |
| Comparative Example 3 | 9.44 | 2.47 | 44.51 |
| Comparative Example 4 | 64.36 | 2.40 | 7.28 |
| Comparative Example 5 | 46.62 | 7.94 | 16.13 |

Evaluation
Evaluation 1: Evaluation of Formulation

Formulation and fluidity of the electrolytes according to the examples and comparative examples were evaluated.

Figure 3:
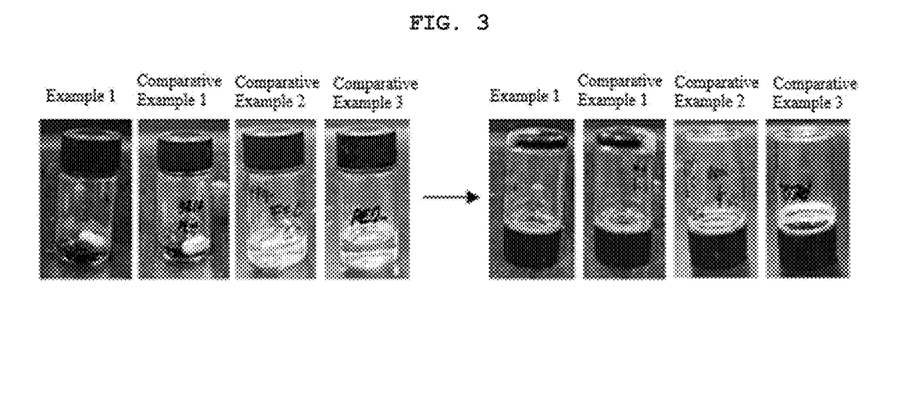
FIG. 3 is photographs illustrating results of evaluating formulation and fluidity of electrolytes prepared according to Example 1 and Comparative Examples 1 to 3.

FIG. 3 is photographs illustrating results of evaluating the formulation and fluidity of the electrolytes prepared according to Example 1 and Comparative Examples 1 to 3.

Referring to FIG. 3, since Example 1 and Comparative Example 1 did not have fluidity as a polymer electrolyte, the polymer electrolytes did not fall even when turned over the bottles containing the polymer electrolytes. In addition, since Comparative Examples 2 and 3 had fluidity as a liquid electrolyte, the liquid electrolyte went down when turned over the bottles containing the liquid electrolytes.

Evaluation 2: Combustion Test

After impregnating a glass filter with the electrolytes according to the examples and comparative examples and igniting it with a torch for 2 seconds, flame retardancy was evaluated by confirming combustion appearances.

Figure 4:
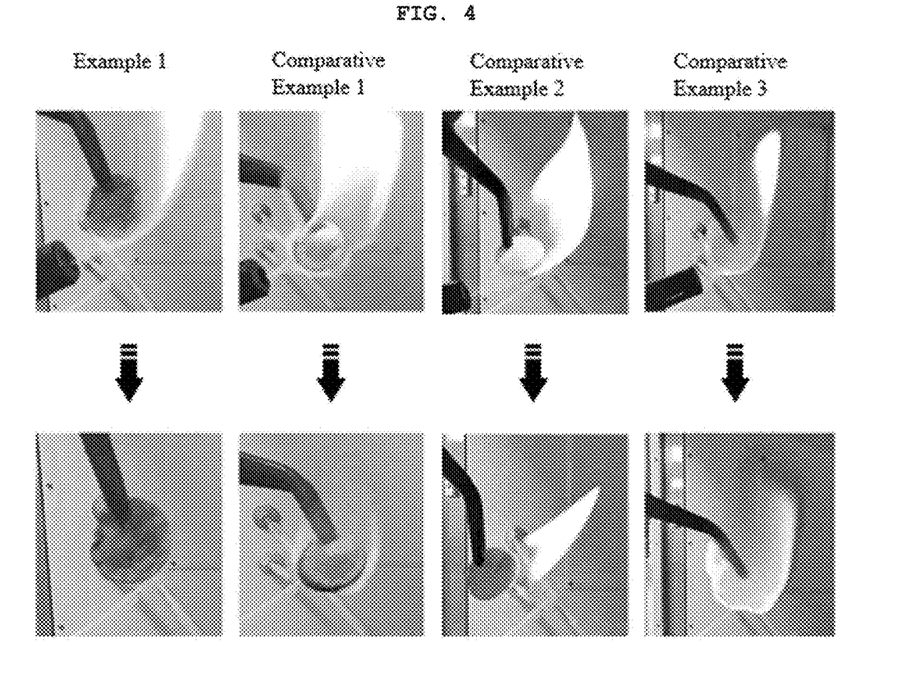
FIG. 4 is photographs illustrating results of evaluating flame retardancy of the electrolytes prepared according to Example 1 and Comparative Examples 1 to 3.

FIG. 4 is photographs illustrating results of evaluating the flame retardancy of the electrolytes prepared according to Example 1 and Comparative Examples 1 to 3.

Referring to FIG. 4, in the case of Example 1, the fire of the electrolyte was extinguished when removing the ignition source, and in the case of Comparative Example 1, the size of the flame of the electrolyte was small, but burned for a short time. In addition, the electrolyte of Comparative Example 2 had a shorter burning duration than the electrolyte Comparative Example 3 but longer than the electrolyte of Comparative Example 1, and the electrolyte of Comparative Example 3 had the longest combustion duration.

Evaluation results are shown in Table 3 below.

Evaluation 3: Evaluation of Ionic Conductivity

The ionic conductivity was measured by electrochemical impedance spectroscopy (EIS).

A stainless steel (SS, Type 304) substrate was brought into contact with both surfaces of each polymer electrolyte prepared according to Example 1, and Comparative Examples 1, 4 and 5, and then AC voltage was applied through electrodes on both surfaces of the polymer electrolyte specimen. A resistance of the polymer electrolyte was obtained from an intersection (R) where semicircles or straight lines of the measured impedance spectra meets a real axis, and the ionic conductivity was calculated from the cross-sectional area and thickness of the prepared polymer electrolyte specimen. The ionic conductivity was calculated by Equation 1 below.

$$\sigma = t/RA \quad \text{[Equation 1]}$$

In Equation 1, $\sigma$ is the ionic conductivity, t is the thickness, A is the cross-sectional area, and R is the resistance of the electrolyte.

Evaluation results are shown in Table 4 below.

Evaluation 4: Evaluation of High-Voltage Stability
1. Manufacture of Lithium Secondary Battery Lithium secondary batteries were manufactured using the above-described electrolytes of Example 1 and Comparative Examples 1 to 3.

(1) A slurry was prepared by mixing $Li[Ni_{0.6}Co_{0.2}Mn_{0.2}]O_2$ as a cathode active material, carbon black as a conductive material, and polyvinylidene fluoride (PVdF) as a binder in a weight ratio of 92:5:3. The slurry was uniformly applied to an aluminum foil having a thickness of 15 μm and vacuum dried at 130° C. The dried slurry was roll-pressed to manufacture a cathode for a lithium secondary battery with a density of 3.2 g/cm³.

(2) A lithium coin half-cell was fabricated by interposing a separation membrane (polypropylene, thickness 20 μm) between the prepared cathode and lithium metal (thickness 100 μm) as a counter electrode (anode). The combination of lithium metal/separation membrane/cathode was put into a coin cell plate.

(3-1) In the case of the polymer electrolytes of Example 1 and Comparative Example 1, 50 μl of the stirred solution of the electrolyte and flame retardant monomer was injected into the coin cell plate, covered with a cap, and then clamped. Thereafter, heat curing was performed at 70° C. for 1 hour, then impregnation was performed for 12 hours or more to manufacture lithium secondary batteries.

(3-2) In the case of Comparative Examples 2 and 3, 50 μl of the liquid electrolyte was injected into the coin cell plate, covering with a cap, and then clamped. Thereafter, impregnation was performed for 12 hours or more to manufacture lithium secondary batteries.

2. CC-CV Charging

After charging the above-described lithium secondary batteries of Example 1 and Comparative Examples 1 to 3 at 0.1 C CC up to 4.2 V, decomposition patterns of the electrolytes were evaluated while sequentially performing CV charging thereon at each voltage of 4.2, 4.3, 4.4, 4.5, 4.6, and 4.7 V for 10 hours.

Figure 5:
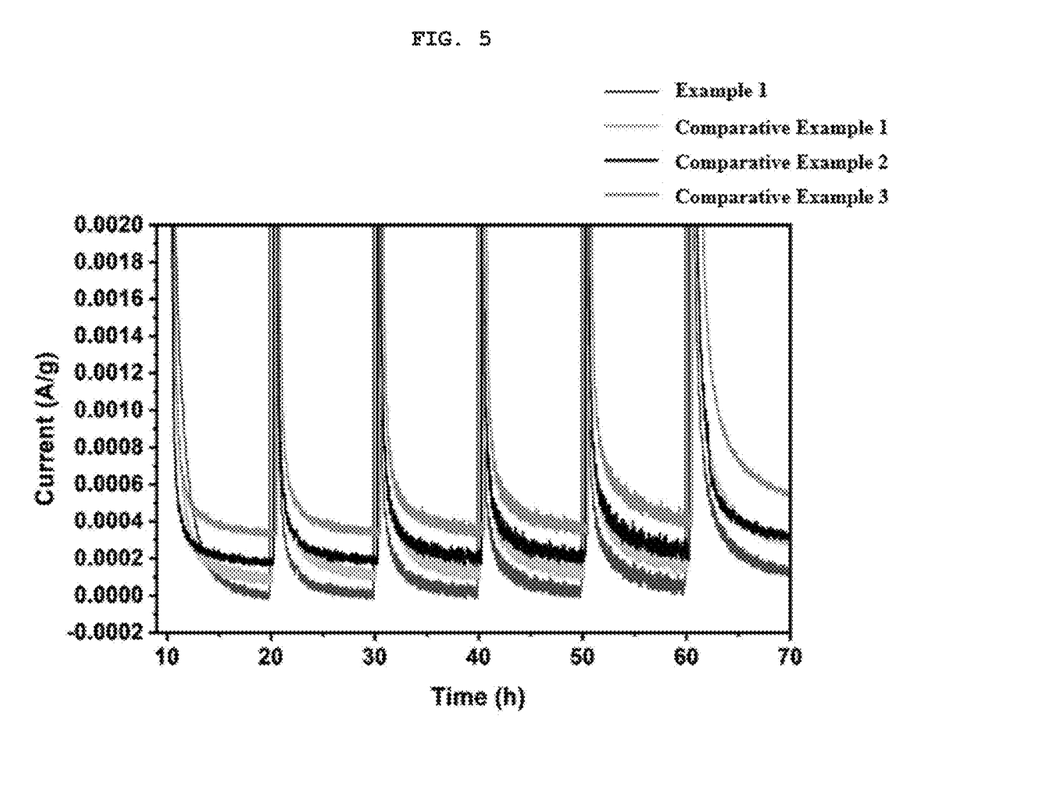
FIG. 5 is a graph illustrating high-voltage stability of lithium secondary batteries manufactured according to Example 1 and Comparative Examples 1 to 3.

FIG. 5 is a graph illustrating high-voltage stability of lithium secondary batteries manufactured according to Example 1 and Comparative Examples 1 to 3.

Referring to FIG. 5, it can be confirmed that the amount of current generated by decomposition of the electrolyte is increased as the voltage is increased over time. Accordingly, it can be seen that in Example 1, the decomposition of the electrolyte was suppressed under a high voltage compared to Comparative Examples 1 to 3. In Comparative Example 3, the electrolyte was easily decomposed under a high voltage compared to Comparative Examples 1 and 2.

TABLE 3

| | Combustion test |
|---|---|
| Example 1 | High flame retardancy |
| Comparative Example 1 | Medium flame retardancy |
| Comparative Example 2 | Medium flame retardancy |
| Comparative Example 3 | Low flame retardancy |

TABLE 4

| | Ionic conductivity |
|---|---|
| Example 1 | 1.4 mS/cm |
| Comparative Example 1 | 1.2 mS/cm |
| Comparative Example 4 | $2.1 \times 10^{-6}$ S/cm |
| Comparative Example 5 | $5.3 \times 10^{-6}$ S/cm |

Referring to Tables 2 to 4, and FIGS. 4 and 5, it can be seen that, in the case of the polymer electrolyte of Example 1, which includes the fluorine-based solvent, lithium salt, and flame retardant polymer containing phosphorus and fluorine, and has a fluorine content of 35 to 60 wt. % and a phosphorus content of 2.3 to 7.5 wt. %, the flame retardancy, ionic conductivity and high-voltage stability are improved compared to the electrolytes of Comparative Examples 1 to 5, which provide a secondary battery including a solid electrolyte sufficiently solidified without leakage due to the low fluidity.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document

What is claimed is:

1. A polymer electrolyte for a lithium secondary battery comprising:
   a fluorine-based solvent;
   a lithium salt; and
   a flame retardant polymer comprising phosphorus and fluorine,
   wherein the polymer electrolyte has a fluorine content of 35 to 60% by weight and a phosphorus content of 2.3 to 7.5% by weight, and
      wherein the flame retardant polymer comprises an aromatic ring or a fluorinated phosphazene.

2. The polymer electrolyte for a lithium secondary battery according to claim 1, wherein the polymer electrolyte has an oxygen content of 7.3 to 30% by weight.

3. The polymer electrolyte for a lithium secondary battery according to claim 1, wherein the flame retardant polymer comprises a moiety derived from a (meth)acrylate group.

4. The polymer electrolyte for a lithium secondary battery according to claim 1, wherein the flame retardant polymer comprises a first structural unit represented by Formula 1:

[Formula 1]

wherein $R_1$ to $R_4$ are each independently a hydrogen atom or a fluorine atom, at least one of $R_1$ to $R_4$ is a fluorine atom, and a is an integer of 1 to 10, and a third structural unit represented by Formula 3:

[Formula 3]

wherein $R_a$ is a substituted or unsubstituted alkyl group having 1 to 5 carbon atoms, a substituted or unsubstituted aryl group having 6 to 20 carbon atoms, or a combination thereof, and n is an integer of 0 to 5.

5. The polymer electrolyte for a lithium secondary battery according to claim 1, wherein the flame retardant polymer comprises a structural unit represented by Formula 4:

[Formula 4]

wherein $R_9$ to $R_{16}$ are each independently a hydrogen atom or a fluorine atom, at least one of $R_9$ to $R_{16}$ is a fluorine atom, and c and d are each independently an integer of 1 to 10.

6. The polymer electrolyte for a lithium secondary battery according to claim 1, wherein the flame retardant polymer comprises a structural unit represented by Formula 5:

[Formula 5]

wherein $R_{17}$ and $R_{18}$ are each independently a hydrogen atom or a methyl group, $R_{19}$ to $R_{26}$ are each independently a hydrogen atom or a fluorine atom, at least one of $R_{19}$ to $R_{26}$ is a fluorine atom, and e and f are each independently an integer of 1 to 10.

7. The polymer electrolyte for a lithium secondary battery according to claim 1, wherein the flame retardant polymer comprises a fourth structural unit represented by Formula 6:

[Formula 6]

wherein $R_{27}$ and $R_{28}$ are each independently a hydrogen atom or a fluorine atom, and at least one of $R_{27}$ and $R_{28}$ is a fluorine atom, and a fifth structural unit represented by Formula 7:

[Formula 7]

8. The polymer electrolyte for a lithium secondary battery according to claim 1, wherein the flame retardant polymer comprises a structural unit represented by Formula 8:

[Formula 8]

wherein $R_{29}$ to $R_{40}$ are each independently a hydrogen atom or a fluorine atom, and at least one of $R_{29}$ to $R_{40}$ is a fluorine atom.

9. The polymer electrolyte for a lithium secondary battery according to claim 8, wherein the flame retardant polymer comprises a structural unit represented by Formula 9:

[Formula 9]

wherein $R_{41}$ to $R_{46}$ are each independently a hydrogen atom or a methyl group, $R_{47}$ to $R_{58}$ are each independently a hydrogen atom or a fluorine atom, at least one of $R_{47}$ to $R_{58}$ is a fluorine atom, and p1 to p6 are each independently an integer of 1 to 10.

10. The polymer electrolyte for a lithium secondary battery according to claim 1, wherein the fluorine-based solvent comprises a fluorine-containing cyclic carbonate and a fluorine-containing linear carbonate in a volume ratio of 1:9 to 3:7.

11. The polymer electrolyte for a lithium secondary battery according to claim 10, wherein the fluorine-containing cyclic carbonate has a structure represented by Formula 10:

[Formula 10]

wherein $R_{59}$ to $R_{62}$ are each independently a hydrogen atom, a fluorine atom, or an alkyl group having 1 to 5 carbon atoms, wherein at least one hydrogen atom of the alkyl group is substituted by a fluorine atom, and at least one of $R_{59}$ to $R_{62}$ is a fluorine atom, or an alkyl group having 1 to 5 carbon atoms, wherein at least one hydrogen atom of the alkyl group is substituted by a fluorine atom.

12. The polymer electrolyte for a lithium secondary battery according to claim 10, wherein the fluorine-containing cyclic carbonate comprises at least one of fluoroethylene carbonate (FEC), difluoroethylene carbonate (DFEC), or trifluoroethylene carbonate (TFEC).

13. The polymer electrolyte for a lithium secondary battery according to claim 10, wherein the fluorine-containing linear carbonate has a structure represented by Formula 11:

[Formula 11]

wherein $R_{63}$ and $R_{64}$ are each independently an alkyl group having 1 to 5 carbon atoms or an alkyl group having 1 to 5 carbon atoms, in which at least one hydrogen atom is substituted by a fluorine atom, and at least one of $R_{63}$ and $R_{64}$ is an alkyl group, in which at least one hydrogen atom is substituted by a fluorine atom.

14. The polymer electrolyte for a lithium secondary battery according to claim 10, wherein the fluorine-containing linear carbonate comprises at least one of methyl 2,2,2-trifluoroethylcarbonate (MTFEC), ethyl 2,2,2-trifluoroethyl carbonate (ETFEC), propyl 2,2,2-trifluoroethylcarbonate (PTFEC), methyl 2,2,2,2',2',2'-hexafluoro-isopropylcarbonate (MHFPC), ethyl 2,2,2,2',2',2'-hexafluoro-isopropyl carbonate (EHFPC), or di-2,2,2-trifluoroethyl carbonate (DTFEC).

15. The polymer electrolyte for a lithium secondary battery according to claim 1, wherein the lithium salt comprises at least one of $LiPF_6$, $LiClO_4$, $LiBF_4$, LiFSI, LiTFSI, $LiSO_3CF_3$, LiBOB, LiFOB, LIDFOB, LiDFBP, LiTFOP, $LiPO_2F_2$, LiCl, LiBr, LiI, $LiB_{10}Cl_{10}$, $LiCF_3CO_2$, $LiAsF_6$, $LiSbF_6$, $LiAlCl_4$, $CH_3SO_3Li$, LiSCN, or $LiC(CF_3SO_2)_3$.

16. The polymer electrolyte for a lithium secondary battery according to claim 1, wherein the polymer electrolyte comprises 10 to 90% by weight of the fluorine-based solvent, 5 to 20% by weight of the lithium salt, and 2.5 to 80% by weight of the flame retardant polymer, each based on a total weight of the polymer electrolyte.

17. A lithium secondary battery comprising:
a case;
an electrode assembly which comprises a cathode and an anode housed in the case; and
a polymer electrolyte for a lithium secondary battery according to claim 1, which is injected into the case.

18. A composition for a polymer electrolyte for a lithium secondary battery comprising:
a fluorine-based solvent;
a lithium salt; and
a flame retardant monomer comprising phosphorus and fluorine, wherein the flame retardant monomer comprises an aromatic ring or a fluorinated phosphazene,
wherein the polymer electrolyte has a fluorine content of 35 to 60% by weight and a phosphorus content of 2.3 to 7.5% by weight.

* * * * *